United States Patent [19]

Baxter, Jr.

[11] E Re. 28,926

[45] Reissued Aug. 10, 1976

[54] GEAR TOOTH DESIGN

[75] Inventor: Meriwether L. Baxter, Jr., Brighton, N.Y.

[73] Assignee: The Gleason Works, Rochester, N.Y.

[22] Filed: Mar. 21, 1975

[21] Appl. No.: 561,011

Related U.S. Patent Documents

Reissue of:

[64] Patent No.: 3,820,414
Issued: June 28, 1974
Appl. No.: 357,036
Filed: May 3, 1973

U.S. Applications:

[63] Continuation-in-part of Ser. No. 274,157, July 24, 1972, abandoned.

[52] U.S. Cl. ..... 74/462; 74/417

[51] Int. Cl.[2] ..... F16H 55/06; F16H 1/14

[58] Field of Search ..... 74/462, 417, 457

[56] References Cited

UNITED STATES PATENTS 3,220,279 11/1965 Dareing ..... 74/462

3,438,279 4/1969 Rouverol ..... 74/462

*Primary Examiner*—Leonard H. Gerin

*Attorney, Agent, or Firm*—Morton A. Polster

[57] ABSTRACT

A new gear design providing increased load-carrying ability while being particularly adaptable to manufacture by lower-cost forming methods with powder metal or plastic materials. The teeth of the gears are unconventional in appearance, having a generally elliptical face outline formed by oppositely curved root and topland lines so that the height of each tooth face is maximum at midpoint and reduces substantially to zero at the length extremeties. The teeth are substantially inclined *depthwise* to the pitch [line] *element* and each gear has a large and small end, the tooth slots being invisible when the finished gear is viewed along its axis from the large end. The disclosure includes constructions and calculations for designing conjugate pairs of such unconventionally-shaped gears having preferred running characteristics.

11 Claims, 22 Drawing Figures

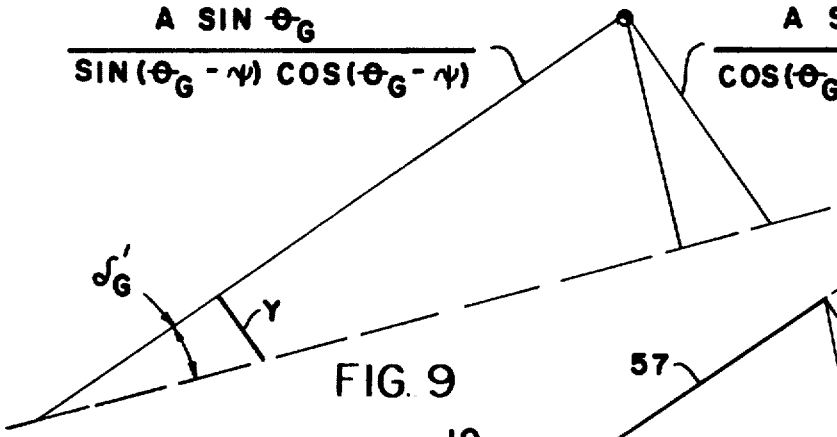
FIG. 9
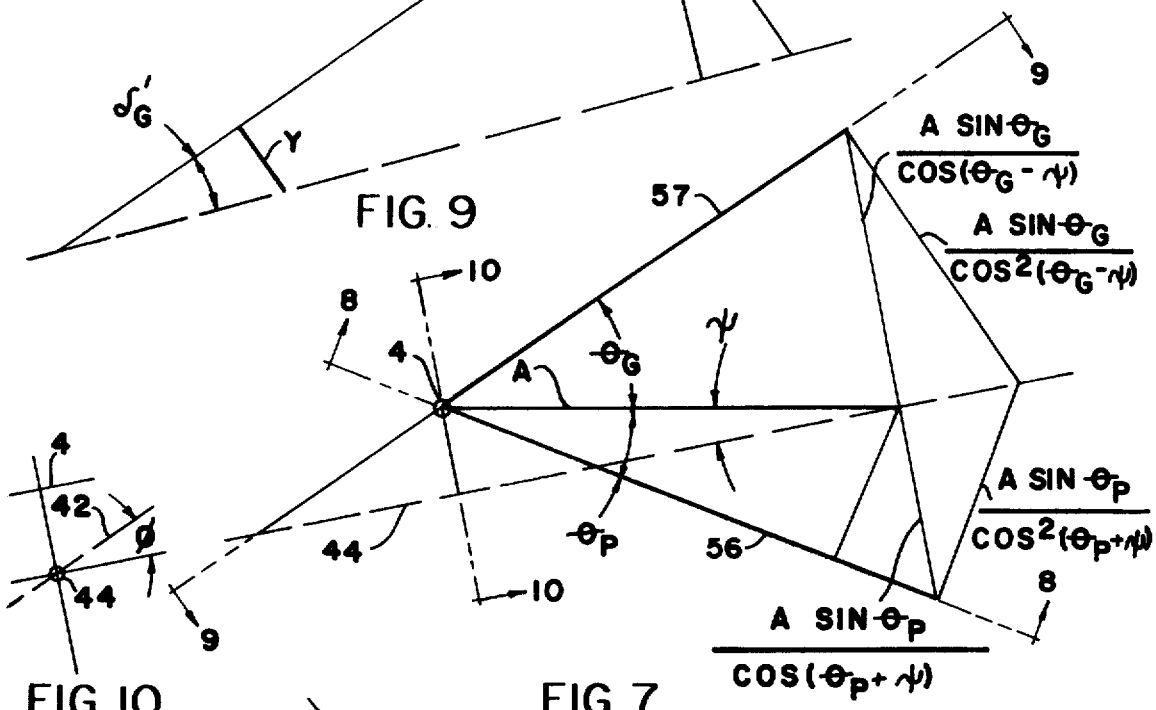
FIG. 10
FIG. 7
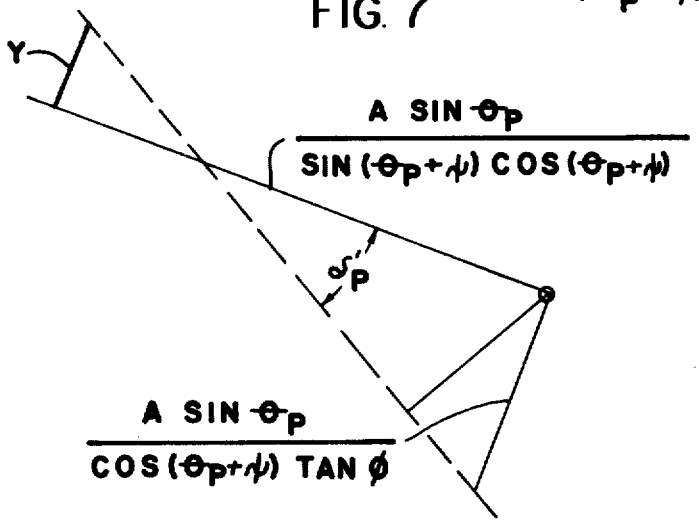
FIG. 8

GEAR TOOTH DESIGN

Matter enclosed in heavy brackets [ ] appears in the original patent but forms no part of this reissue specification; matter printed in italics indicates the additions made by reissue.

This is a continuation-in-part of my application Ser. No. 274,157, filed July 24, 1972 now abandoned.

This invention relates to the design of gearing and, more particularly, to an unconventional tooth design.

BACKGROUND OF THE INVENTION

The novel gear design disclosed herein fulfills two economically important objectives which have long been of primary concern to gear manufacturers, namely.

1. to provide gears which can be manufactured at high production rates with remarkably reduced costs, and
2. to increase the load-carrying ability of gears without increasing their size.

While this new design is expected to be of particular importance to plastic and powder metal gearing, it is equally applicable to the field of heavy duty bevel gears, especially automotive differentials. Such heavy duty bevel gears have traditionally been made by processes of metal cutting that have forced their design into well established patterns. With the advent of new and improved metal-forming techniques, some of the design limitations imposed by practical cutting methods have been removed, and manufacturers of gears can take advantage of the removal of these limitations to achieve advances in product improvement and/or economy. As an example of a bevel gear design proposed to take advantage of new metal forming techniques, an attempt has been made recently to revive the very old concept of tooth shrouding. However, such shrouding is merely the addition of web-like reinforcing sections across the ends of the tooth slots, and the teeth of such shrouded gears employ conventional tooth designs.

As different from such recent prior art attempts, it is the intent of the invention herein to take full advantage of the freedom and speed of production offered by new gear-forming processes and new materials, e.g., powder metal and plastics, by departing remarkably from all present tooth designs. This novel tooth shape disclosed herein includes two concepts which have been known for many years but have been seldom, if ever, used in commercial gear design: "elliptical" shape, and inclining teeth *depthwise* relative to the pitch [line] *element*. Those skilled in the art will recognize this latter concept as one proposed primarily for the purpose of gaining some small improvement in smoothness of motion transmission from tooth to tooth and that, whenever proposed, it has incorporated root and face surfaces of conventional straight line generatrices. The other concept, of elliptically-shaped gear teeth, was proposed more than fifth years ago in U.S. Pat. No. 1,390,414 as a means for improving tooth strength. Neither of these ideas has ever found acceptance in the gear industry, and never has it been known or even remotely suggested to combine these two separate, distinct and highly unusual concepts. However, this is exactly what is done to obtain the radical new concepts in tooth design which are disclosed herein, and these new concepts not only include considerations of improved geometry for tooth strength but also seek to optimize the efficiency and economy of the new manufacturing processes by making possible the utilization of die arrangements which are simpler and less expensive to make and maintain than the die formats required to produce gears of conventional prior art designs.

While it is anticipated that the tooth design of the invention will find particularly wide acceptance in the special field of bevel gears, especially in automotive differentials as stated above, this invention is broadly applicable to other fields of gearing such as spur gears and helical gears. It should be noted that although both preferred forms of the novel gear design disclosed herein are quite unconventional in appearance, they will be identified with the conventional gear terms "bevel" and "cylindrical," since the imaginary pitch surfaces of these novel gear forms are conical and cylindrical, respectively.

SUMMARY OF THE INVENTION

The radically novel design disclosed herein provides gears with "embraced teeth;" these are teeth that are "braced" by buttressing material at both ends, and whose working area is "embraced" by the gear body. The gear teeth are substantially inclined *depthwise* to their pitch [lines] *elements* and each gear has a large end and a small end, the tooth slots being invisible when the finished gear is viewed along its axis from its large end. Besides being strikingly unconventional in appearance, these new gears also fulfill the important objectives referred to above: Due to the unique buttressing design, they have higher fatigue strength and can carry greater loads than conventionally-designed prior art gears of similar size and, because of their unusual design, they can be manufactured with simpler and less costly forming dies.

The novel design, as applied to bevel gears, can be seen generally in FIG. 1 which shows the new tooth outlines (solid and dashed lines) overlaid on a standard conventional bevel gear design (phantom lines). The outstanding visible characteristics of the tooth form of the invention are the extreme lengthwise concavity and convexity of the root surfaces and the topland or face surfaces, respectively; the essentially zero tooth height at the extremities; and the fact that the tooth slots are not visible when the gears are viewed from their large ends. Indicative of the "extreme concavity of the root surfaces," in preferred designs for these novel bevel gears the radius of the root surface of the teeth in an axial plane is generally less than the radius from the gear axis to the centroid of the working area of the teeth, as will be explained below. (*Those skilled in the art will appreciate that the term "working area" refers to the surface areas of each tooth which can engage the surface areas of the teeth of a mating gear.*) Particular attention is called to the fact that the continuously curved tooth bottoms prevent the type of stress concentrations which occur in conventionally shrouded teeth at the junction of tooth slot and shroud. Further, the path of metal flow in forming such curved tooth bottoms is much smoother so that forming strains are reduced.

While strikingly unconventional in general format and appearance, the bevel gears disclosed herein have tooth profiles corresponding to those obtained with the well known method of complementary crown gear generation, or with known modifications of this method, including circular arc profiles. Similarly, the teeth of cylindrical gears designed according to the invention can be designed with equally familiar complementary rack generation principles or with other equally well known modifications of that conventional principle of operation. Therefore, those skilled in the art will appreciate that the constructions and formulas detailed herein are merely exemplative of the presently preferred methods of designing pairs of these unconventionally-shaped gears.

FIG. 7 is an enlarged and exaggerated view of [ FIG. 6, showing the pitch element, the spiral angle, and ] *part of FIG. 6, with the spiral angle reversed, and showing* centerlines of the slots of both the gear and pinion;

FIG. 8 is a view perpendicular to the pitch plane of FIG. 7, showing the central plane of the pinion slot;

FIG. 9 is a view similar to FIG. 8 but showing the central plane of the gear slot;

FIG. 10 is a view of the normal plane, perpendicular to the pitch plane of FIG. 7 and showing the normal pressure angle;

In the figures, constructions representing particular trigonometric expressions are shown in heavy lines connected to the expression represented, and cross-hatching has been omitted from the drawings of gear sections to assure greater clarity and facilitate understanding of the basic geometric constructions shown.

DETAILED DESCRIPTION OF THE INVENTION

Basic parameters for the novel gear tooth design disclosed herein include the location of the centers and radii for the concave root surfaces and convex face surfaces of the teeth, as will be explained in greater detail below. As will be appreciated by those skilled in the art, criteria used in choosing these values for preferred embodiments should include:

1. Providing maximum working depth equal to or slightly larger than the mean working depth of the teeth of a conventional gear of similar size.
2. Leaving sufficient solid metal under all tooth ends and on toplands to avoid heat treatment distortion and breakage problems.
3. Providing as large a face width as possible, based on the face width of a comparable conventional design and, in the case of bevel gears, with the centroid of the working tooth area at as large a cone distance as possible, within the limitations of (1) and (2) above.
4. Maintaining adequate profile contact ratios to insure proper carryover of motion transmission from tooth-to-tooth and to stay within well-established gear manufacturing limits for bending and surface stresses.
5. Providing tooth slots on both members which are invisible when the finished gear is viewed along its axis from the back, this latter criterion being included specifically to assure that forming-die design can be greatly simplified.

To facilitate understanding of the unique features of the novel gears of this invention, in the description of the bevel gear embodiment comparisons will be made with conventionally designed gears of similar size.

Figure 2:
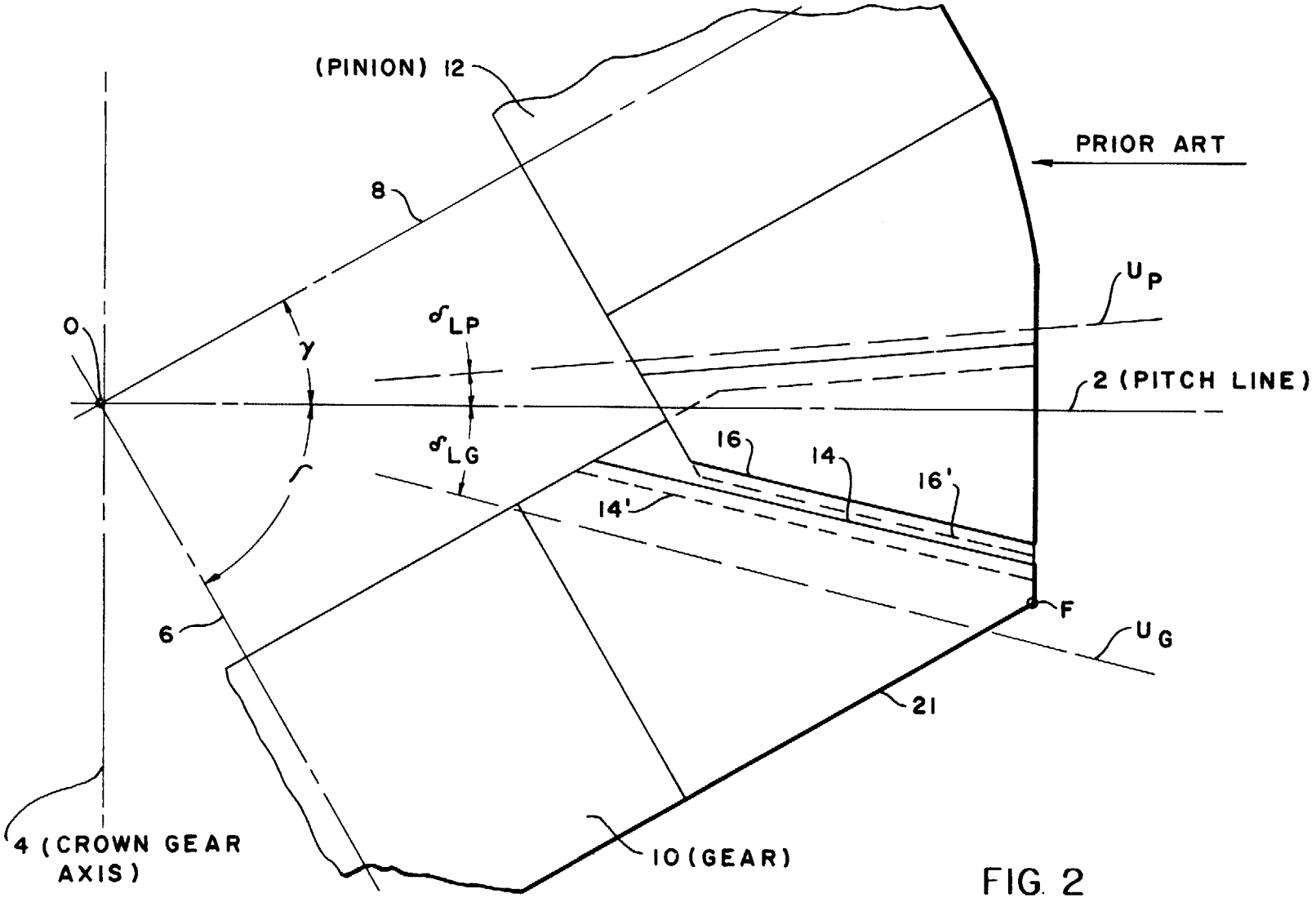
FIG. 2 is an axial section of a standard design pair of prior art bevel gears, showing undercut limit lines for both members and dashed lines showing a modification (increasing pinion addendum and gear dedendum) which serves as a basis for the new tooth design of the invention.

Beginning with the invention as applied to bevel gearing, FIG. 2 shows an axial section of a bevel gear set of conventional design which is to be effectively modified according to the new design disclosed and claimed herein. In FIG. 2 are shown the pitch [ line ] *element* 2, the axis 4 of the complementary crown gears of generation, and the gear and pinion axes 6 and 8, relating to a generated gear 10 and pinion 12. The undercut limit lines for pinion 12 and gear 10 are, respectively, the dashed lines $U_P$ and $U_G$ obtained by calculating the limit dedendum angle $\delta_{LP}$ and δLG by the approximate formulas:

1. $\tan \delta_{LP} = \tan \gamma \sin^2 \phi$
2. $\tan \delta_{LG} = \tan \Gamma \sin^2 \phi$ where $\gamma$ and $\Gamma$ are pinion and gear pitch angles and $\phi$ is the pressure angle.

It can be seen that pinion 12 is free from undercut, i.e., its root line is close to but does not exceed the undercut limit, while gear 10, on the other hand, is not near an undercut situation. Therefore, gear root line 14 (and the corresponding pinion face line 16) can be modified to the dotted positions 14' and 16' to obtain more working depth, and this modification is assumed, since such an increase in the working depth of the conventional gear pair is preferred as a basis for constructing a similarly-sized gear pair of the invention. Of course, it will be appreciated by those skilled in the art that the magnitude of this modification is a matter of judgment, since, if carried too far, it would require pointed teeth on the mating pinion. Further, it will be understood that a similar adjustment could have been made initially on the pinion, if conditions had warranted. In any event, these modified tooth depths (which are greater than the depths of a conventional design) will now be used as a basis for constructing a similarly-sized gear pair according to a preferred gear design of the invention.

Figure 3:
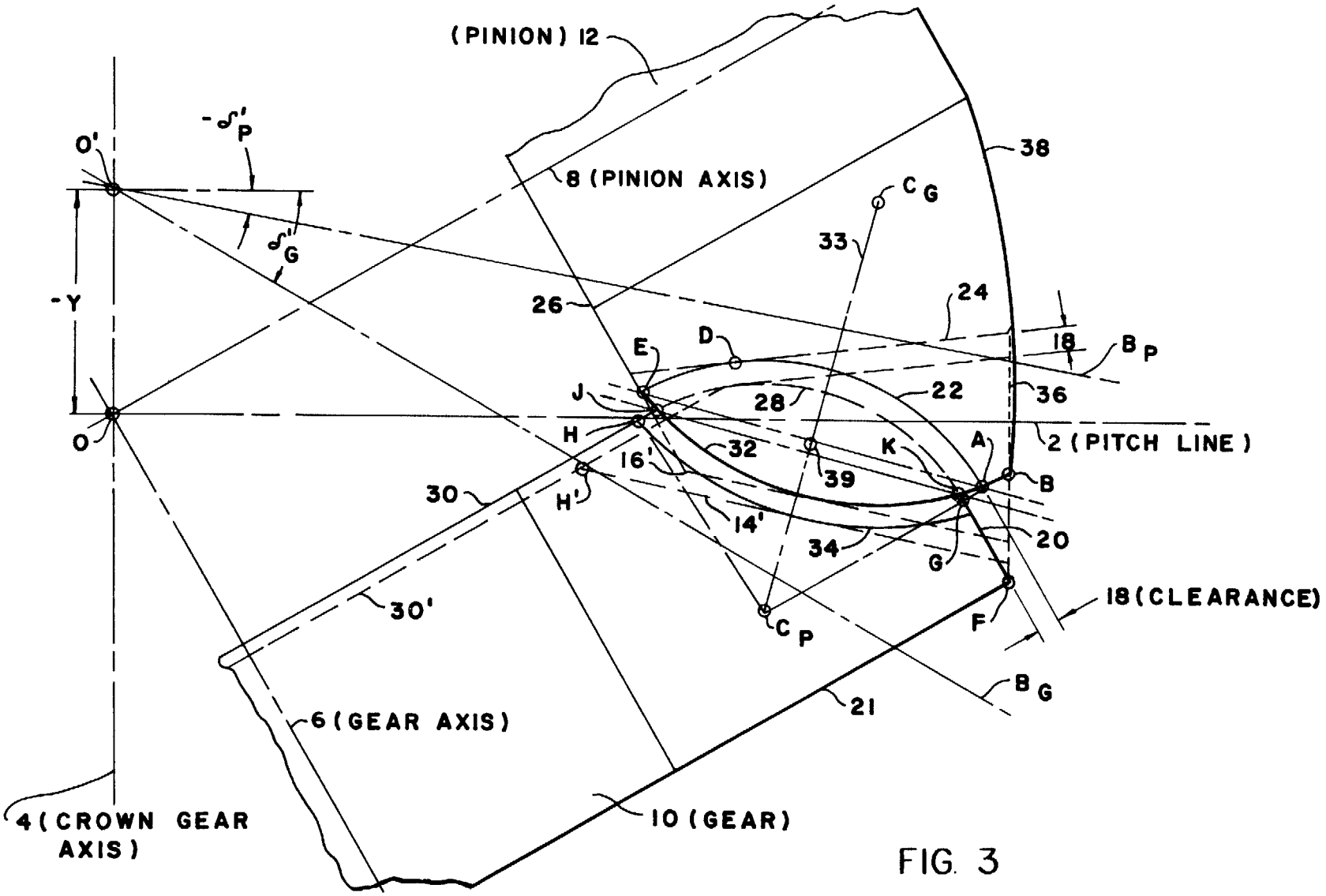
FIG. 3 is an axial section of the bevel gear pair incorporating the addendum-dedendum modifications illustrated in FIG. 2 with an overlay of the new tooth outlines of the invention.

Basic constructions for the new tooth form are shown in FIG. 3, and it will be noted that adjusted root and face lines 14' and 16' are point F are the same as shown in FIG. 2. Construction begins with the selection of a tooth bottom clearance 18, and while the size of clearance 18 is generally the same as is found in the conventional design, it is unconventionally measured radially outward of the gear axis from F. That is, from F a line 20 is drawn parallel to the gear axis 6, and a point [ A ] *A'* is radially spaced from said line by the amount of the clearance desired. Point [ A ] *A'* is also radially spaced from the pinion axis 8 such that a distance [ AB ] *A'B*, measured parallel to the pinion axis to point B on the back surface of the pinion, represents an amount of metal under the pinion slots predetermined to be sufficient to properly support the ends of the teeth.

With the unconventional selection of point [ A ] *A'* a pinion root [ circle ] *arc* 22, with its center $C_P$ on line [ AB ] *A'B* extended, is drawn through point [ A ] *A'* and tangent to the adjusted pinion root line 24, its point of tangency being designated as D and its intersection with the pinion front face 26 being indicated at E.

Next, a gear face [ circle ] *arc* 28 is constructed using the same center $C_P$ but with a radius reduced by the amount of clearance 18. It can be seen that the outside surface of the gear blank, represented by earlier-constructed line 20, is thus made tangent to face [ circle ] *arc* 28 at G, thereby maintaining the original mounting surface area 21 of the conventional gear as shown in FIG. 2. The front surface 30 of the gear is preferably constructed tangent to face circle 28 at H, but may be kept in its old position 30' if desired without detrimentally departing from the inventive tooth shape. (In this regard, it is merely coincidental that the gear root [ circle ] *arc* 34, which is constructed later, appears to pass through H.)

A chord [ AE ] *A'E* is constructed next and, perpendicular to it, a line 33 is drawn through $C_P$. On line 33 a center $C_G$ is chosen such that a [ circle ] *arc* 32, passing through points [ A ] *A'* and E, will be substantially tangent to adjusted pinion face line 16'. [ Circle ] *Arc* 32 is the pinion face [ circle ] *arc*. A gear root [ circle ] *arc* 34 is now constructed from the same center $C_G$ but with a radius increased by the amount of clearance 18.

The conventional back angle may be maintained unchanged (as indicated by surface 36) or, as in the preferred embodiment illustrated a spherical mounting surface 38 may be extended as much as desired to obtain more contact area on the mounting surface. In any event the amount of metal under the pinion slots at the heel, [ AB ] *A'B* should be maintained at a satisfactory value for proper tooth end support. Pinion front face 26 will generally remain unchanged from conventional designs.

It will be appreciated by those skilled in this art that the foregoing is only one of many possible procedures for locating centers $C_P$, $C_G$ and for determining the face and root radii so that the desired objectives are attained and also that other necessary dimensions can be scaled from a large-scale layout, or can be calculated by an equivalent set of formulas.

Thus, in FIG. 3, dotted straight gear root and pinion face lines 14' and 16' represent basic modifications made to the conventional design of the original teeth, as disclosed above in reference to FIG. 2, and, based upon this greater-than-conventional tooth depth, curved lines 22 and 32, 28 and 34, outline the new teeth of the invention herein on a novel gear pair of similar size. It should be noted that in the preferred construction just described, centers $C_P$ and $C_G$ are chosen such that the working area of the teeth is inclined [ lengthwise ] *depthwise* to the pitch [ line ] *element* to assure that adequate working areas will still be obtained while achieving the object of providing teeth which are invisible when viewed from the large end of the gear.

Because of the inclination of the working tooth area and the curved face lines resulting from the foregoing procedure, there is in general no well-defined crown point or outer cone distance, as will be apparent to those skilled in the art and, therefore, many familiar design terms have to be abandoned, such as pitch diameter, outside diameter, apex to crown, pitch, root angle and face angle.

Still referring to FIG. 3, special attention is called to the fact that in preferred embodiments, [ the tooth pitch line tangent planes ] *plane crown gear tooth surfaces* are made to intersect at point O' on the axis 4 (of the complementary crown gears of generation) instead of at the pitch apex O. That is, [ the planes tangent to the tooth profiles at the pitch line ] *plane surfaces of the crown gears* on alternate sides of a *crown gear* tooth [ slot ] intersect in a line, and for the [ pinion teeth ] *crown gear that generates the pinion tooth space* this intersection line is represented in FIG. 3 as $B_P$, while the similar intersection line for the [ gear teeth ] *crown gear that generates the gear tooth space* is designated $B_G$. These two lines both intersect crown gear axis 4 at point O' rather than O. This design variation combined with the inclined working tooth area results in practical slot width and toplands at toe and heel. It should also be noted that while the average spiral angle is zero and the teeth are technically straight, the individual tooth sides nevertheless have a spiral angle, and therefore, a corresponding amount of face overlap with its known incidental advantages of improved strength and smoothness.

Referring once again to FIG. 1, attention is called to the quantities $L_P$, $R_P$, $L_G$, $R_G$, *each measured along, and perpendicular to, the respective pinion and gear axes, and*

*being* the respective coordinates of centers $C_P$ and $C_G$ which were noted above. These quantities, along with the value of (−Y) which is assumed so that it delineates a point near to the intersection of line JK (FIG. 3) with the crown gear axis, will now be used in calculations defining the novel tooth design in mathematical terms and describing in detail how this tooth design can be obtained by well-known gear manufacturing methods of crown gear generation. Points J and K are the respective inner and outer crossing points of the two face circles 28 and 32, and thus define the lengthwise extremities of the working tooth area.

At the mid-point of line JK a perpendicular to JK may be constructed having as its extremities the face circles 28 and 32. The mid-point 39 of this perpendicular may be arbitrarily defined as the "centroid of the working tooth area."

Figure 1:
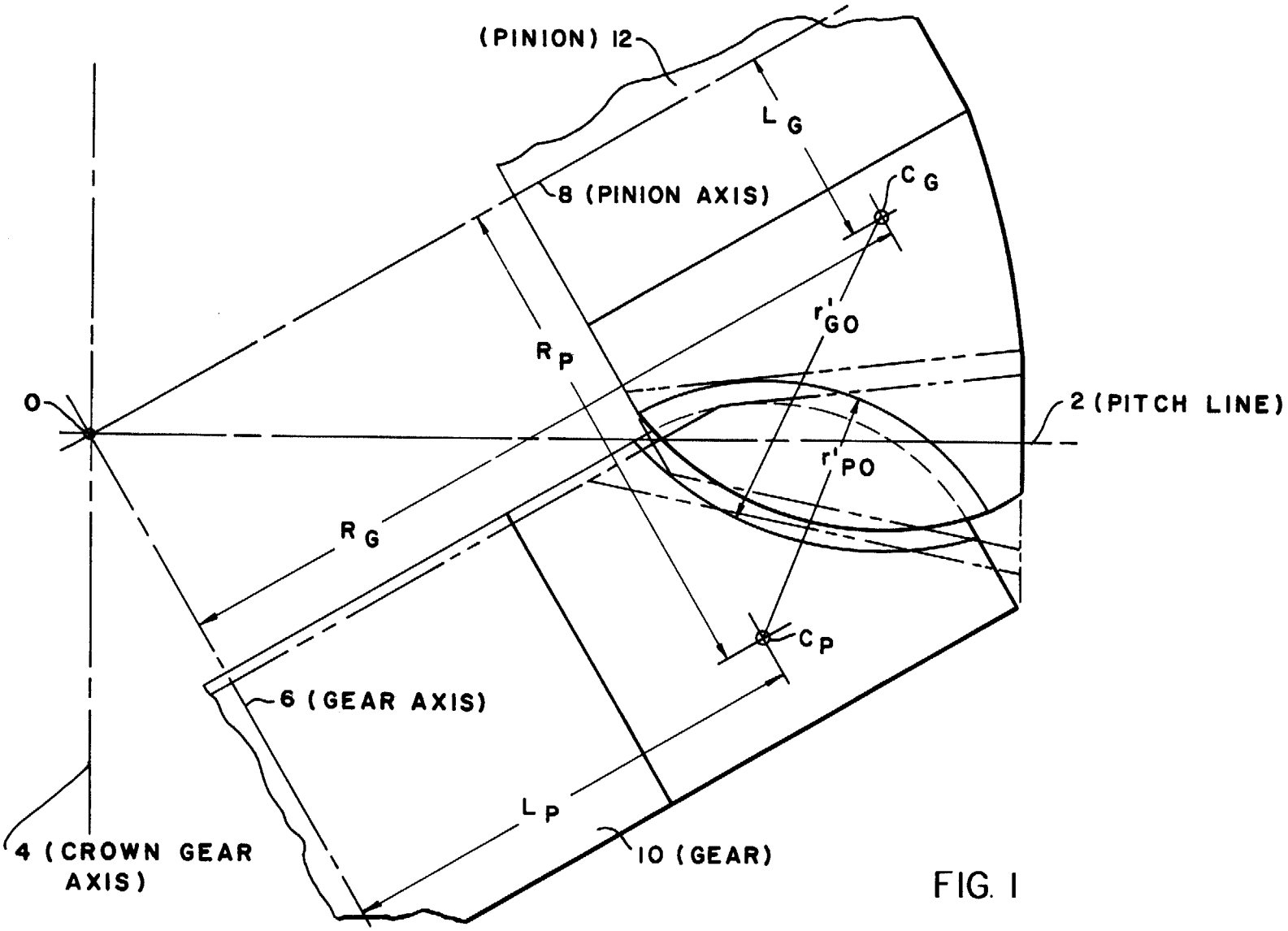
FIG. 1 is an axial section of a pair of bevel gears which shows the new tooth outlines of the invention superimposed over gears of conventional prior art design, the latter being shown in phantom lines.
Figure 4:
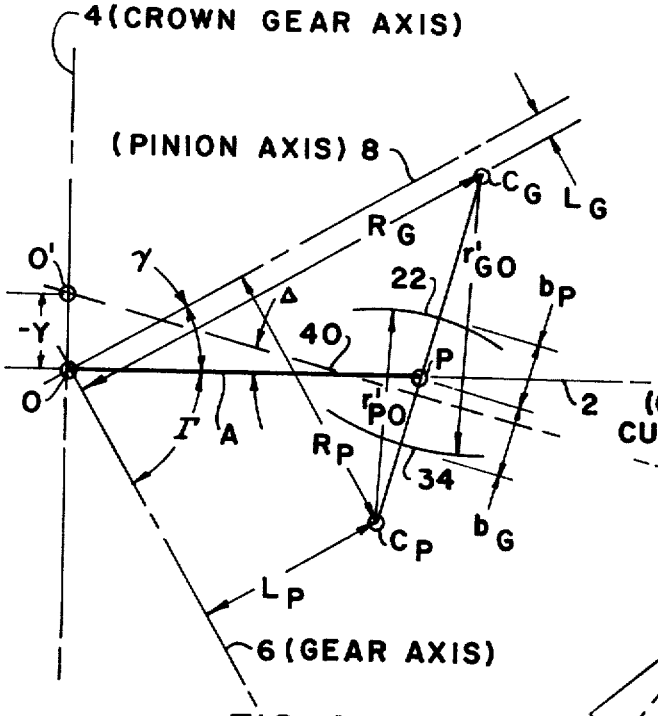
FIG. 4 is an axial section similar to FIG. 3, but is a diagrammatic view showing new tooth-form construction lines only.
Figure 5:
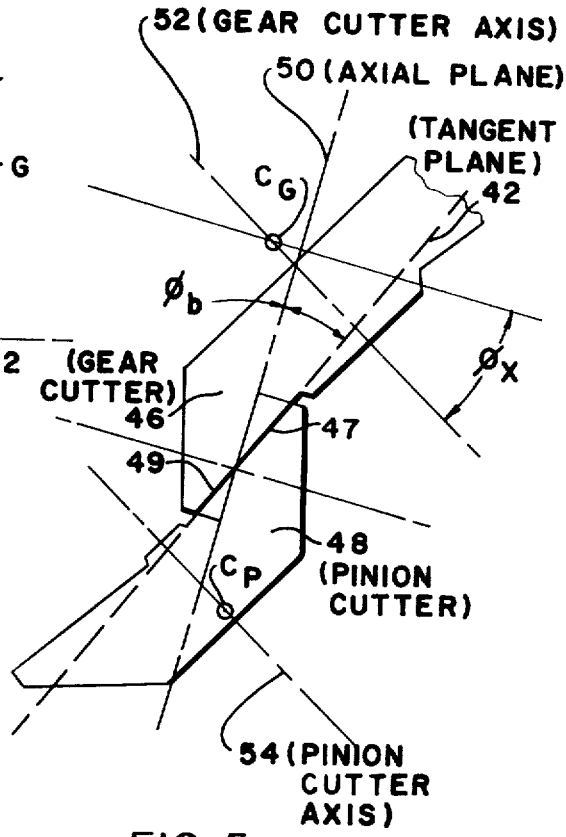
FIG. 5 is a view taken in a plane perpendicular to the axial plane of FIG. 4 and containing the points $C_G$ and $C_P$, and the axes of the cutters that would be used to generate bevel gears according to the invention.

FIG. 4 is similar to FIGS. 1 and 3 and provides constructions for defining the pitch point P, the mean cone distance A, dedendums $b_P$, $b_G$, and the angle Δ. Formulas derived from this diagram are shown below:

3. $Y_G = R_G \cos \Gamma - L_G \sin \Gamma$ Refer to FIG. 13
4. $X_G = R_G \sin \Gamma + L_G \cos \Gamma$
5. $Y_P = R_P \cos \gamma - L_P \sin \gamma$
6. $X_P = R_P \sin \gamma + L_P \cos \gamma$
7. $\tan \Delta = X_G - X_P / Y_G + Y_P$
8. $A = X_G - \tan \Delta$ The dashed lines 40, 42, 44 in FIGS. 4, 5 and 6, respectively, are the traces of the [ planet tangent to the tooth surface at pitch point P at the time when tooth contact occurs at P. ] *plane crown gear tooth surfaces*. Assuming generation of the novel gears by conventional cutting processes, FIG. 5 shows how the required complementary cutters 46, 48 lie, with their cutting edges 47, 49 in the tangent plane 42, which makes an angle $\phi_b$ with the axial plane 50. It will be understood that cutters 46, 48 are dish-type milling cutters whose cutting edges 47, 49, when rotated, sweep relatively flat internal conical surfaces of revolution. While cutters 46, 48 are a well known type, it will be appreciated that they will have to be much smaller, relative to the size of the gears being cut, than known prior art cutters. That is, in manufacturing bevel gears of the invention the cutter radius will generally be less than the length of a radial line from the axis of rotation of the gear being cut to the centroid of the working tooth area. Or, stated in another way, in preferred embodiments of the novel tooth design the radius of concavity of the root line is less than the length of said radial line to the centroid of the working tooth area.

The size of angle $\phi_b$ is initially selected according to the normal pressure angle $\phi$ desired, this selected value to be varied by logical trial and error procedures as will be understood by those skilled in the art. Similarly, angle $\phi_X$, the inclination angle of cutter axes 52, 54, is also initially assumed to be slightly larger than $\phi_b$, and its value is varied to obtain the desired lengthwise mismatch. The angle $\phi_X$ and the dish angle $\Delta\phi$ (FIGS. 11, 12) are not necessarily the same on both members.

Figure 6:
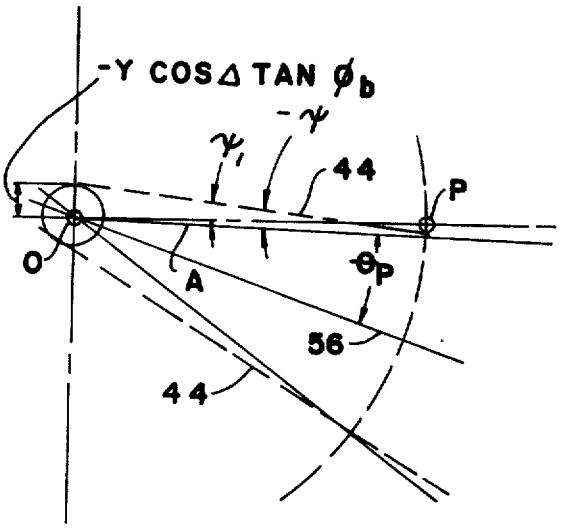
FIG. 6 is a view taken in a plane perpendicular to the axial plane of FIG. 4 and also perpendicular to the axis of the theoretical complementay crown gears of generation; the plane of this view may be considered the pitch plane of the novel gear pair.

FIG. 6 is a view taken in the pitch plane (containing pitch [ line ] *element* 2 of FIG. 1), and illustrates constructions relating to the following formulas for calculating both the spiral angle Ψ and the running pressure angle $\phi$ (FIG. 10) which is defined as the angle between the crown gear axis and the tangent plane:

9. $\tan \Psi_1 = \tan \phi_b \sin \Delta$ Assume $\phi_b$
10. $\tan \phi = \tan \phi_b \cos \Delta \cos \Psi_1$ Change $\phi_b$ to adjust
11. $\sin \Psi = Y/A \tan \phi$ Shown also in FIG. 6 are the central plane 56 of the pinion slot and $\theta_P$, the space angle of the pinion slot, which will be further explained below with reference to FIGS. 7–10 which are four views illustrating the following relationships between $\delta'_P$, $\delta'_G$, $\theta_P$, $\theta_G$ (where $\theta$ is the space angle of the slot, $\delta'$ locates the line of intersection of the tangent planes and $N_c$ is the number of teeth in the imaginary generating crown gear):

12. $\sin (\theta_P + \Psi) = \tan \delta'_P$ and $\phi$
13. $\theta_G = 180°/N_c - \theta_P$
14. $\tan \delta'_G = \sin (\theta_G - \Psi)/\tan \phi$ The gear slot central plane is shown at line 57. The assumption of $\delta'_P$ governs the relative thickness of gear and pinion. The calculated lines of intersection $B_P$, $B_G$ of the tangent planes, referred to above and shown in FIG. 3, are also obtained with the above formulas, and it will be noted that these lines clear the deepest parts of the tooth slots by about equal amounts, this being accomplished by changing $\delta'_P$ to provide a reasonable thickness balance.

Figure 11:
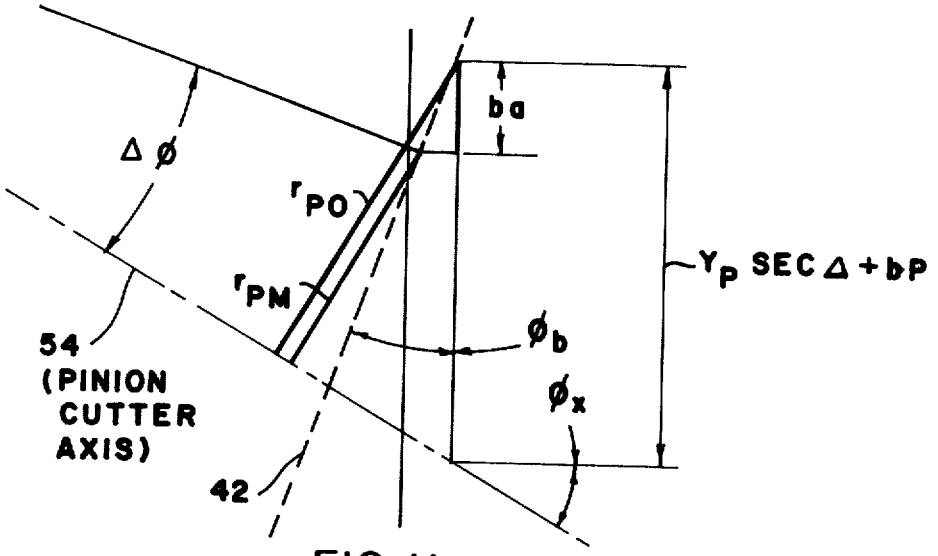
FIG. 11 is an enlarged and exaggerated view of FIG. 5, showing detailed dimensions of the pinion cutter, and the cutter dish angle.
Figure 12:
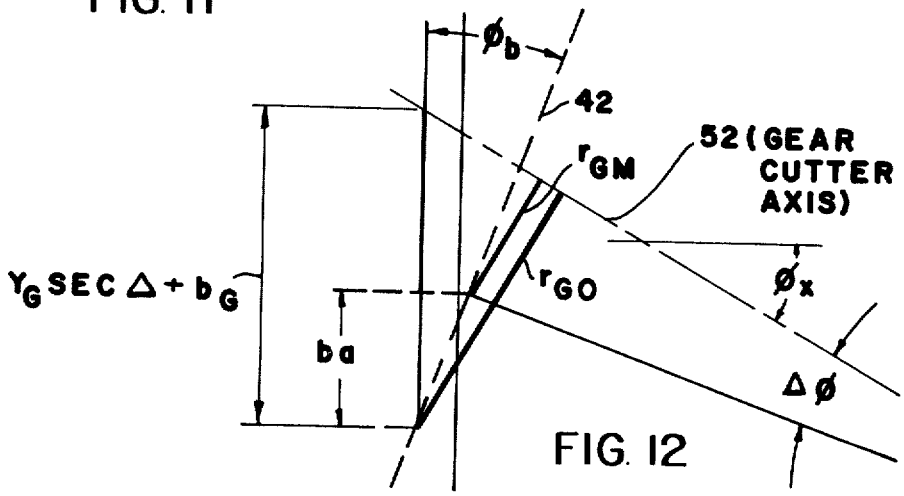
FIG. 12 is a view similar to FIG. 11, but showing the gear cutter.

The views of FIGS. 11 and 12 are similar to FIG. 5 and show the generating cutters in somewhat more detail, particularly the radii $r_{PM}$, $r_{GM}$ and the dish angle $\Delta\phi$ which are used to calculate the lengthwise mismatch by formulas (15)–(20) given below. These formulas are for the usual case where the assumed angle $\phi_X$ is the same for both pinion and gear, the chosen value for $\phi_X$ being changed to get suitable mismatch.

15. $r_{PO} = (Y_P \sec \Delta + b_P) \cos \phi_X$ Assume $\phi_X$
16. $r_{GO} = (Y_G \sec \Delta + b_G) \cos \phi X$
17. $r_{PM} = r_{PO} - b_a \cos \Delta\phi / \cos \phi_b$ $\Delta\phi = \phi_X - \phi_b$ 18. $r_{GM} = r_{GO} - b_a \cos \Delta\phi / \cos \phi_b$

[ $b_a = b_P + b_G/2$ ] $b_a = (b_P + b_G)/2$

19. $1/r_M = \sin \Delta\phi \, (1/r_{PM} + 1/r_{GM})$
20. $(BF) = \sqrt{0.002 \, r_M}$ BF is the approximate length of the tooth contact pattern. To obtain the desired value for BF, an adjustment can be made in the previously selected value of $\phi_X$.

Figure 13:
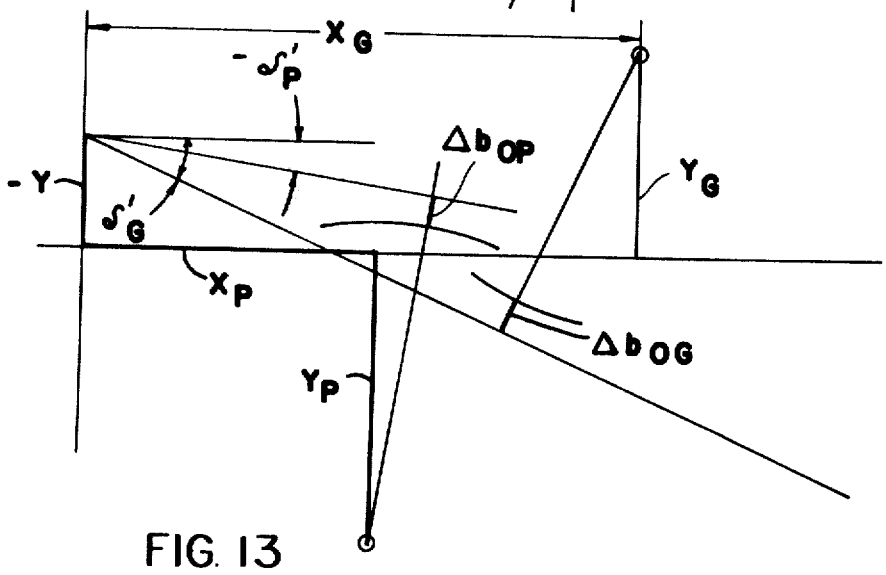
FIG. 13 is an exaggerated view similar to FIG. 4, in which the central planes of gear and pinion slots are individually considered to have been rotated into the axial plane.
Figure 15:
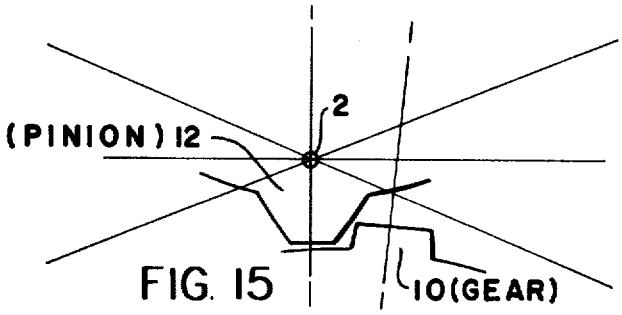
Figure 16:
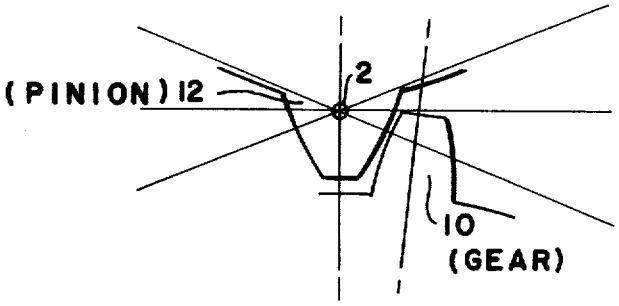
Figure 17:
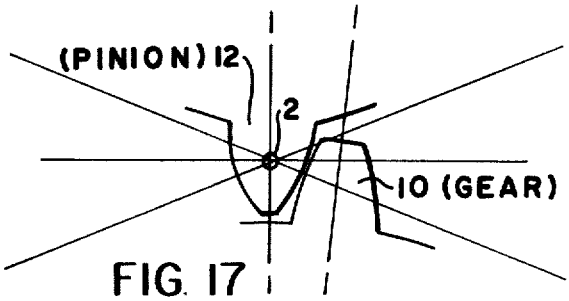
Figure 18:
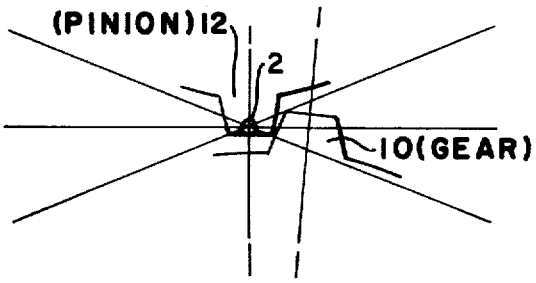

The derivation of formulas (21) and (22) can be understood from FIGS. 7–10 and formulas (23)–(26) by reference to FIG. 13. The angle $\phi_i$ is the angle between the tangent plane and the central plane of the slot for each member, and is used to calculate minimum slot width $W_P$ and $W_G$ as follows:

21. $\tan \phi_{iP} = \tan \phi / \cos (\theta_P + \Psi) \cos \delta'_P$
22. $\tan \phi_{iG} = \tan \phi / \cos (\theta_G - \Psi) \cos \delta'_G$
23. $\Delta b_{OP} = (Y_P - Y) \cos \delta'_P + X_P \sin \delta'_P - (Y_P \sec \Delta + b_P)$
24. $\Delta b_{OG} = (Y_G + Y) \cos \delta'_G + X_G \sin \delta'_G - (Y_G \sec \Delta + b_G)$
25. $W_P = 2 \Delta b_{OP} \tan \phi_{iP}$
26. $W_G = 2 \Delta b_{OG} \tan \phi_{iG}$ In designing a pair of gears according to the invention herein, the above formulas can be used in the manner just explained above. As is understood by persons skilled in the art, following such calculations it is possible, by well known means of [ back cone ] *transverse plane* layout, to show the teeth of the proposed new gear design in several transverse sections to provide a further check on thicknesses, toplands, and undercut. The plane of such a typical transverse section is represented by line 62 in FIG. 14, and FIGS. 15–18 are a set of actual [ back cone ] *transverse plane* layout showing four such transverse sections. FIG. 15 shows the tooth profiles near the heel of the gear pair, while FIGS. 16, 17, and 18 show the profiles of the same teeth central of the heel, central of the toe, and near the toe, respectively. In the course of proper gear design, these layouts would be inspected to assure that neither gear member is undercut and that toplands and thicknesses are reasonably balanced. In this regard $\delta'_P$ can be varied to balance thicknesses, and dedendums or ratio changed to correct undercut.

Figure 14:
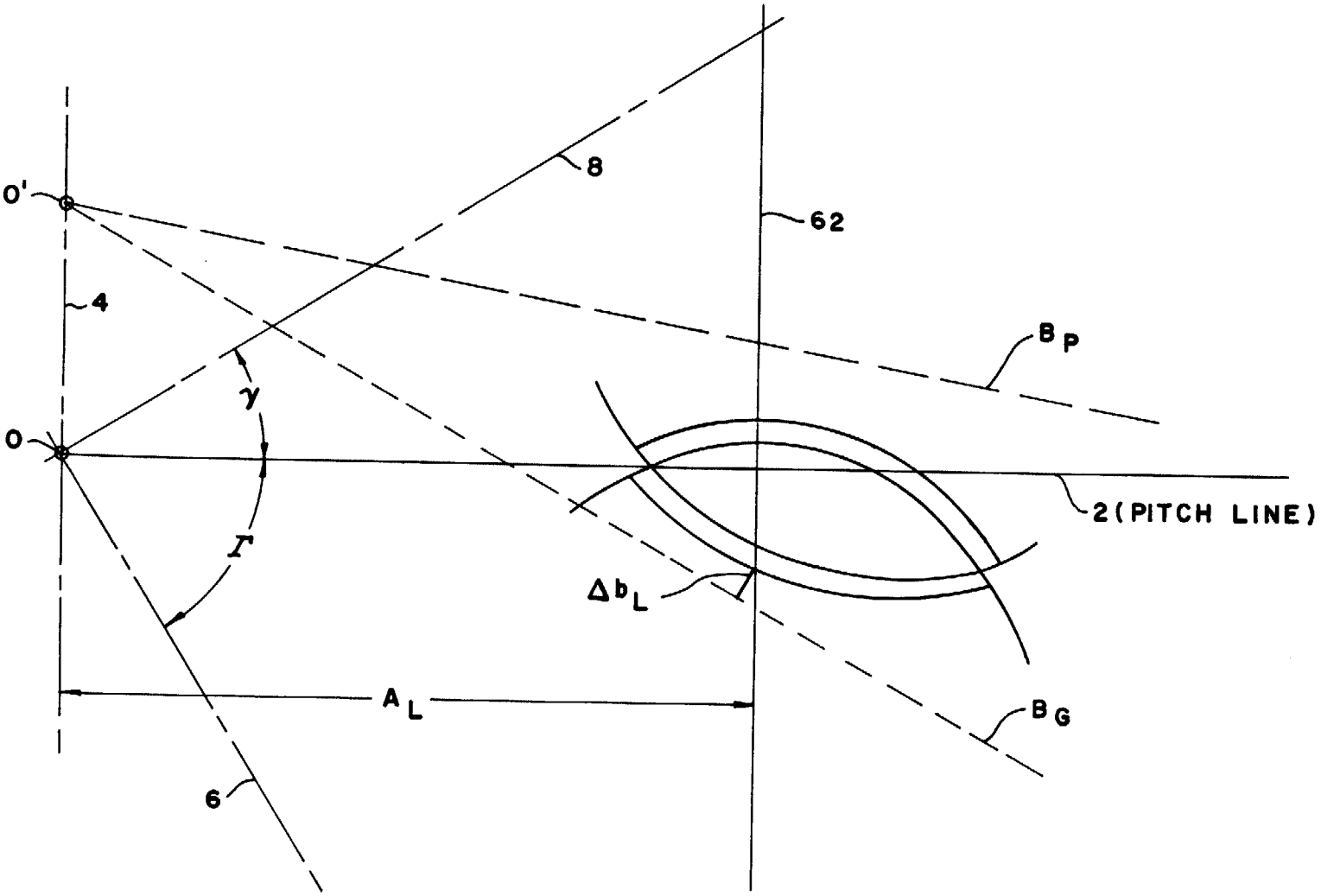
FIG. 14 is an axial plane layout of a bevel gear pair according to the invention, showing tooth outlines from which data is obtained to make the layouts of FIGS. 15–18; and, FIGS. 15–18 are transverse plane layouts of the tooth profiles of the gears shown in FIG. 14, the layouts being taken at four different cone distances, respectively: near the heel, central heel, central toe, and near the toe.

Data for the addendums, dedendums and clearances in the desired transverse section can be obtained from a large-scale layout of the axial section such as shown in FIG. 14, where $A_L$ is the cone distance to the chosen section. Also taken from the layout is distance $\Delta\ b_L$ from which the gear slot width at that section can be calculated from the equation:

27. $W_{GL} = 2\ \Delta\ b_L \tan \phi_{iG}$

The transverse pressure angle $\phi_T$ is obtained from the equation:

28. $\tan \phi_T = \tan \phi / \cos \Psi$

While the gear design disclosed herein is remarkably unconventional, those skilled in the art will appreciate that good-running gears of this design can be manufactured to dimensions calculated by utilizing conventional bevel gear generating theory modified in accordance with the information provided herein by the constructions shown and the formulas related hereto. Of course, it will be understood that, in applying generation theory to the design of tooth surfaces for these novel gears, all the usual modifications known to the art for generating bevel gears may be employed. These include such things as mismatch of surfaces to produce theoretical instantaneous point contact and, what is particularly desirable, use of a so-called "bias change" to cause contact to progress along the tooth substantially in the direction JK, FIG. 3, in order to increase overlap, smoothness and load-sharing among teeth. Such a bias change is well-known in the spiral bevel gear art, and is known to be accomplished by generating the pinion with a crown gear of reduced cone distance.

It will be appreciated that the general gear tooth design of the invention as just described above with particularity in relation to a pair of bevel gears may also be embodied in other types of gearing, e.g., in cylindrical gearing such as spur and helical gears, or even in irregularly shaped gears or racks. As noted above, one of the advantages of this novel design is to use new forming processes, but to assure complete understanding of the novel tooth form as applied to such other types of gearing, constructions will now be shown and described in a manner which should permit those skilled in the art to manufacture such other gearing by conventional cutting methods on prior art machines. For instance, machines of the type using cutters having interlocking, radially-projecting blades, such as those shown in U.S. Pat. Nos. 2,824,498 and 3,176,586, or minor modifications of such machines, might preferably be used and, generally, smaller diameter cutters than normally used in such machines would be employed.

In a relatively simple and preferred manner of approaching the design of cylindrical gearing according to the invention, as in conventional design, certain parameters are preselected according to the ultimate function of the pair. Namely, one must decide on the pitch radii and number of teeth in each member of the pair, the desired clearance, face width and working depth of the teeth, and also the transverse pressure angle and helix angle, if appropriate. Based upon these given parameters, a pair of gears can be designed by using the formulae set forth below and the constructions illustrated in FIGS. 19–22.

Figure 19:
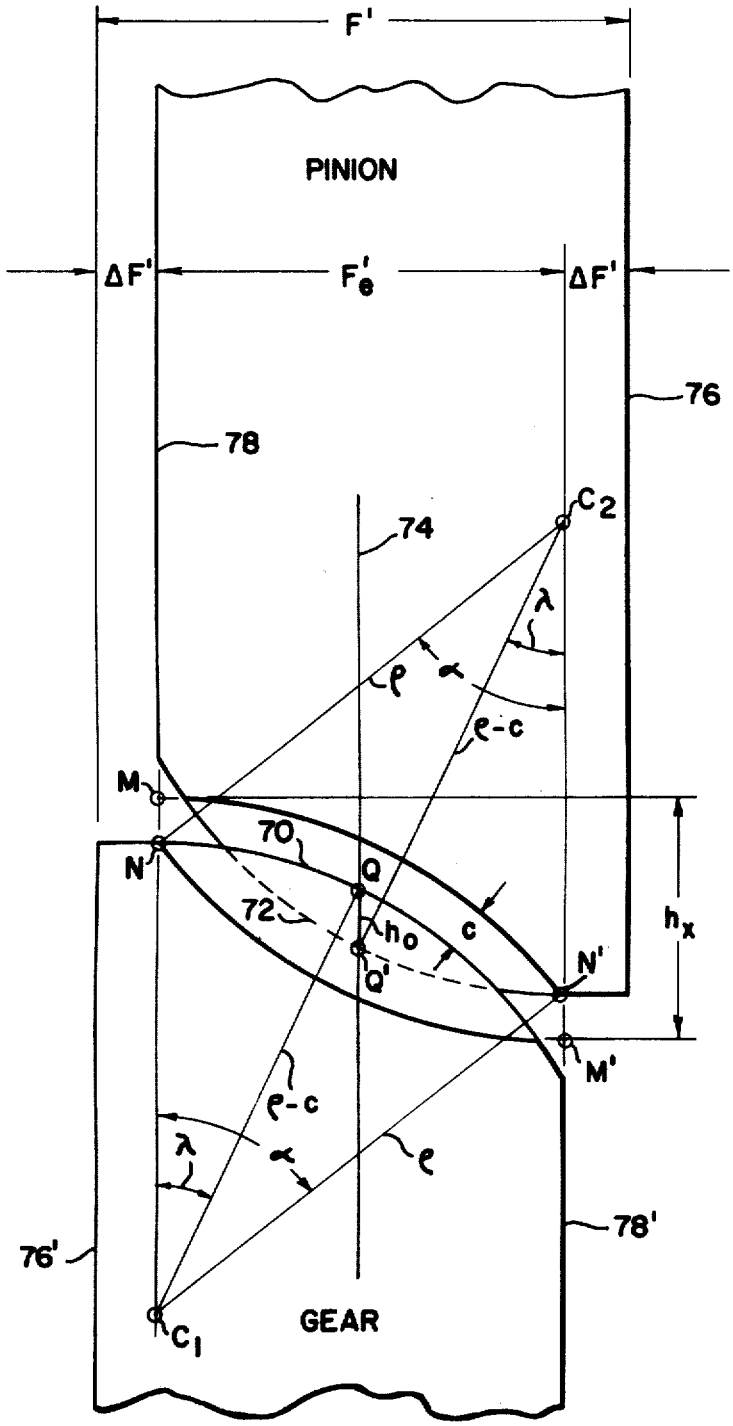
FIG. 19 is an axial section of a pair of cylindrical gears according to the invention, showing certain constructions necessary to their design.

The initial constructions are shown, in a somewhat exaggerated manner, in FIG. 19:

First, the blanks for the pair are partially blocked out in the common axial plane by laying out two initial parallel lines spaced apart by the desired face with $F'_e$, as shown. The pinion root arc is constructed next by selecting a tooth curvature center $C_1$ on the gear along one of the parallel lines and a radius $\rho$ greater than face width $F'_e$, striking the arc MN'. Then point N is located such that $\overline{MN}$ equals the predetermined clearance c. Next, $C_2$ is located on the pinion along the other initial parallel line at a distance $\rho$ from point N, and gear root MN' is drawn. This establishes the overall depth $h_x$. (It should be noted that the arcs MN' and NM' need not have the same radius, but such equal radii are preferred.)

Using $C_1$ as a center and a radius equal to $C_1N$, gear topland arc 70 is drawn. Similarly, with $C_2$ as a center and a radius equal to $\overline{C_2N'}$, pinion topland arc 72 is constructed. A line representing central plane 74 is drawn equidistant from the two initial parallel lines, and the distance between the intersections Q and Q' of central plane 74 and topland arcs 70 and 72, respectively, represents the maximum working depth $h_o$ of the teeth.

In order to eliminate the acute angle that is formed at points N and N' between the respective root arcs MN' and NM' and the two initial parallel lines, an additional shoulder width $\Delta\ F'$ is added and establishes the full width $(F'_e + \Delta\ F')$ of each gear.

The constructions described above provide gear blanks having a unique shape in which the tooth areas are inclined so that each gear has a "large end" 76, 76', a "small end" 78, 78', and zero face angles at the large end so that the tooth slots are not visible when the gears are viewed axially from their large ends. With this basic construction, it is possible to design the specifics of tooth shape with well-known formulas.

For a given $\rho$, the maximum working depth $h_o$ at the center of the face can be calculated by the following formulas, where c is the clearance:

29. $\sin \alpha = F'_e/\rho$

30. $\sin \lambda = F'_e/2\ (\rho - c)$

31. $h_O = \rho \text{ vers } \alpha - c - 2\ (\rho - c) \text{ vers } \lambda$

The dimension $\rho$ is varied systematically until a value of $h_o$ is obtained that is equal to, or slightly larger than, the working depth of conventional gears of the same pitch. Then, overall depth $h_x$ can also be calculated:

32. $h_x = \rho \text{ vers } \alpha = c$

Using preselected values for the pinion pitch radius r, the pressure angle, and the center distance between the shafts of the gears, the pitch [ line ] *element* can be located relative to the constructed tooth outlines. For gears with equal or nearly equal number of teeth it is reasonable to place the pitch [ line ] *element* such that it bisects the distances $h_o$ and $h_x$. Thus addendums and dedendums of both members at corresponding points are equal.

To confirm freedom from undercut when locating the pitch [ line ] *element*, the limit dedendum is calculated as follows:

33. $b_L = r \sin^2 \phi_t$ where r is the pinion pitch radius and $\phi_t$ is the transverse pressure angle. For no undercut, $b_L$ should be greater than one-half of $h_x$ for the equal-addendum case.

Figure 20:
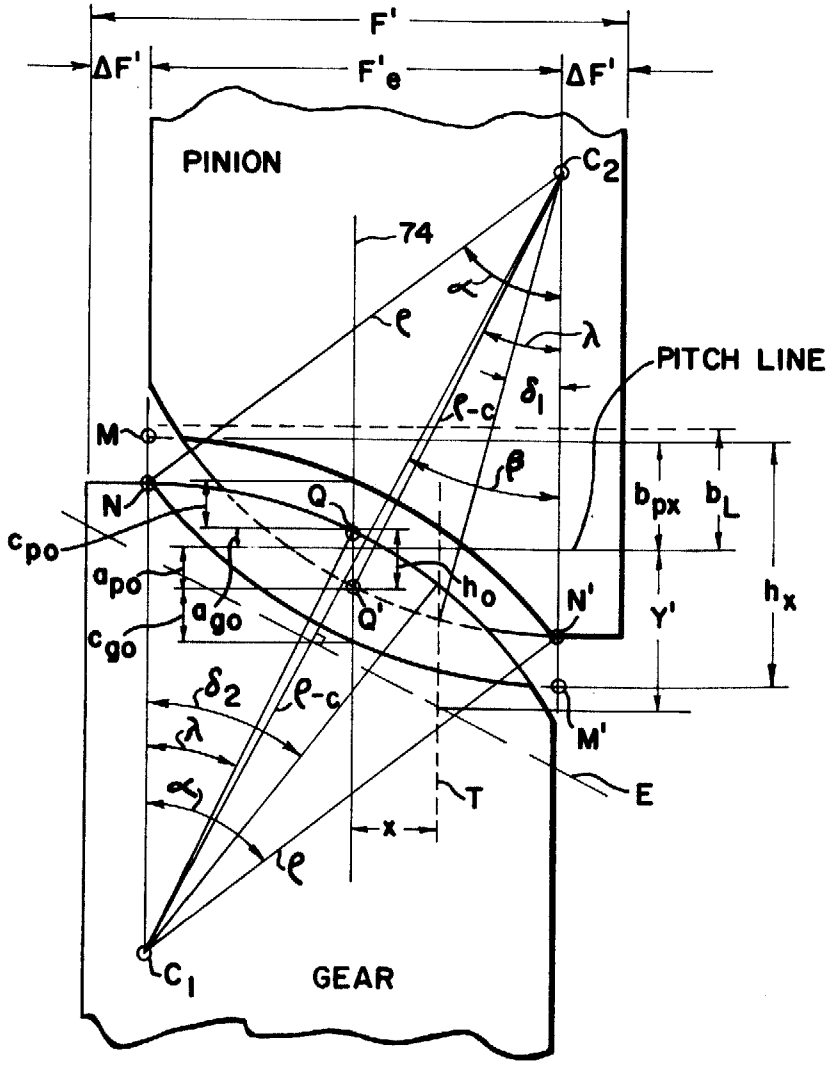
FIG. 20 is a view similar to FIG. 19, but including further constructions and elements required for design calculations.

When the gear ratio is substantially different from 1, the limit dedendum of the pinion is used to locate the pitch [ line ] *element* as shown in FIG. 20, such that undercut of the pinion at point M is just avoided. Undercut on the gear is not usually a factor.

In any event, the location of the pitch [ line ] *element* is specified by the quantity $b_{px}$ which will usually be equal to half of $h_x$ for the equal-addendum case, and equal to or slightly less than $b_L$ for the case of unequal addenda (FIG. 20).

Figure 21:
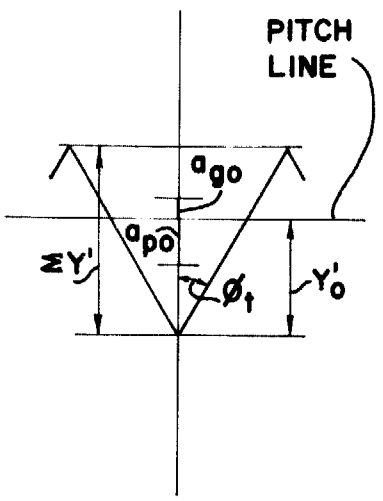
FIG. 21 shows the constructions (in the transverse central plane designated in FIG. 20) for one theoretical rack required to generate the teeth shown in FIG. 20 with involute profile.
Figure 22:
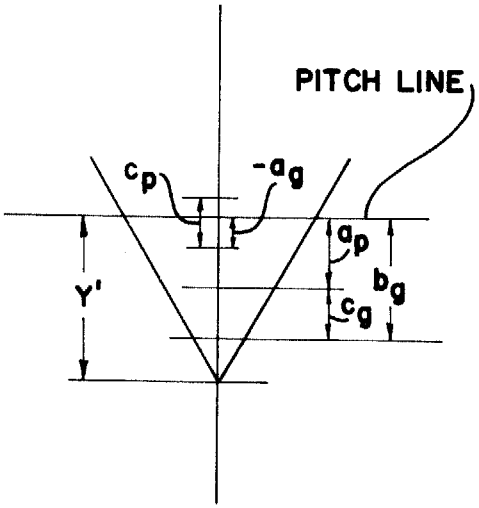
FIG. 22 shows constructions similar to those in FIG. 21, but in a second transverse plane.

When the pitch [ line ] *element* has been located the addendums $a_{po}$ and $a_{go}$, and clearances $c_{po}$ and $c_{go}$ for the pinion and gear respectively in the central plane 74 can be calculated by the formulas:

34. $a_{po} = (\rho - c) \cos \lambda - \rho \cos$ [d] $\alpha - (b_{px} - c)$
35. $a_{go} = (\rho - c) \cos \lambda - (\rho - b_{px})$
35'. $a_{go} = h_o - a_{po}$
36. $c_{go} = c_{po} \cong c \sec \lambda$ In principle any tooth profile form can be used, but only the involute will be considered here. This means generation will be by means of a theoretical rack having plane sides. A section of the generating rack taken in the central plane 74 is shown in FIG. 21. The peak-to-peak rack height is given by 37. $\Sigma Y' = \frac{1}{2} p_c \operatorname{ctn} \phi_T$ where $p_c$ is the circular pitch. The rack position relative to the pitch line is specified by the distance [ $y_o$ ] $y'_o$ where 38. $y'_o = k (\Sigma y' - h_o) + a_{po}$ The constant k determines the relative thickness of pinion and gear teeth. A value of $K = 0.5$ is a good average figure and results in "symmetrical rack" proportions.

It is now possile to lay out the sections of the gear and pinion teeth taken in the central plane 74.

Because of the inclined working areas of the teeth, it is necessary to tip the generating rack to match this incline in order to get good slot widths and toplands. This has additional advantages in the forming process since it opens up the teeth toward the small end much like a bevel gear.

It is preferred to tip the generating rack elements so that they are perpendicular to a line connecting centers $C_1$ and $C_2$. To do this, the rack is tipped through the angle $\beta$ which is calculated as follows:

39. $\tan \beta = F'_e/(\rho - c) + \rho \cos \alpha$

When this is done, the intersection line of the tangent planes of the generating rack can be represented by line [ E ] $E'$. Now as can be seen from FIGS. 20 and 22, it is possible to calculate the tooth height and thickness at any desired section T located along the tooth face a distance x from central plane 74 by the following formulas:

40. $\sin \delta_1 = \frac{1}{2} F'_e - x/(\rho - c)$
41. $c_G = c \sec \delta_1$
42. $ap = (\rho - c) \cos \delta_1 - \rho \cos \alpha - (b_{px} - c)$
43. $\sin \delta_2 = \frac{1}{2} F'_e + x/(\rho - c)$
44. $c_p = c \sec \delta_2$
45. $ag = (\rho - c) \cos \delta_2 - (\rho - b_{px})$
46. $y' = y'_o + x \tan \beta$ Using this information, it will be appreciated that gear and pinion tooth shapes can be determined in any number of sections along the face either by conventional layout or the equivalent involute calculations in a manner similar to that illustrated in FIGS. 15–18 and discussed above in relation to the bevel gear embodiment of the invention. As mentioned above, the overall thickness balance between pinion and gear can be controlled by choice of k (formula 38). The change in thickness balance from end to end can be controlled by selecting an angle $\beta$ different from its calculated value.

Pinion toplands may turn out to be smaller than desired. This condition may be improved in a variety of ways:

1. Changing thickness balance for a thicker pinion
2. Reducing working depth $h_o$
3. Going to a finer pitch (larger tooth numbers)
4. Increasing the face width It will be appreciated that, if the gear helix angle is other than zero, tool dimensions must be accordingly adjusted in the manner well known in the art in order to produce the above-calculated transverse rack-tooth dimensions.

Having described in detail a preferred manner of designing pairs of bevel and cylindrical gears according to the invention, it will be understood by those skilled in the art that the particular constructions and formulas set forth above are only intended to assist in the selection and preparation of suitable dies, cutters, or other tooling for manufacture of such novel gear pairs. That is, the invention does not reside in the particular constructions and formulas shown but rather in the novel and remarkably unconventional shape of the gears, namely, gears having elliptical teeth inclined *depthwise* to the pitch [ line ] *element*, each gear having a larger end from which, when viewed axially, the gear slots can not be seen.

Therefore, special attention is again called to the fact that gears of the novel curved-tooth design disclosed herein are particularly amenable to manufacture by die-forming processes: Since the tooth slots can be made invisible when the gears are viewed axially from their larger rear end, die manufacture and maintenance is greatly simplified, and the tooth shape is also very favorable from the standpoint of minimizing plastic deformation strains during the forming process. Further, the greater strength of the novel "embraced" teeth make this design suitable for heavy duty gears made from ferrous materials as well as for gears made from lighter powder metals and plastics.

What is claimed is:

1. A gear of a mating gear pair having engaging tooth profiles, said gear comprising tooth and slot configurations in which:

a. the root lines are concave curves,
b. the topland surfaces of the teeth are convex curves, [ substantially parallel to the root lines of the mating gears ]
c. the maximum tooth height is substantially at mid-length of each tooth,
d. said tooth height reduces substantially to zero at the length extremities, and
e. the working areas of [ the teeth ] *each tooth* are inclined *depthwise* to the pitch [ line ] *element*.

2. A gear according to claim 1 in which the tooth slots are invisible when said gear is viewed axially from one of its ends.

3. A gear according to claim 1 wherein said mating gear pair is a pair of bevel gears whose pitch apex lies on the axis of imaginary generating crown gears and wherein [ planes tangent to the tooth profiles at the pitch line on ] *plane tooth surfaces of said crown gears which generate* alternate sides of a tooth slot intersect in a line, said line intersecting said crown gear axis at a point remote from the pitch apex of said gear pair.

4. A gear according to claim 3 in which the radius of concavity of the root line of said gear is less than the length of a radial line from the axis of rotation of said gear to the centroid of its working tooth area.

5. A gear according to claim 1 wherein said concave and convex curves are substantially circular arcs.

6. A bevel gear of a mating gear pair having engaging tooth profiles, said bevel gear comprising tooth and slot configurations in which:

a. the root lines are concave curves, b. the topland surfaces of the teeth are convex curves, [ substantially parallel to the root lines of the mating gear]

c. the maximum tooth height is substantially at mid-length of each tooth, d. said tooth height reduces substantially to zero at the length extremities, and e. the working areas of [the teeth] *each tooth* are inclined *depthwise* to the pitch [ line] *element*.

7. A bevel gear according to claim 6 in which the tooth slots are invisible when said bevel gear is viewed axially from one of its ends.

8. A bevel gear according to claim 6 wherein said concave and convex curves are substantially circular arcs.

9. A cylindrical gear of a mating cylindrical gear pair having engaging tooth profiles, said cylindrical gear comprising tooth and slot configurations in which:

a. the root lines are concave curves, b. the topland surfaces of the teeth are convex curves, [ substantially parallel to the root lines of the mating gear]

c. the maximum tooth height is substantially at mid-length of each tooth, d. said tooth height reduces substantially to zero at the length extremities, and e. the working areas of [the teeth] *each tooth* are inclined *depthwise* to the pitch [ line] *element*.

10. A cylindrical gear according to claim 9 in which the tooth slots are invisible when said gear is viewed axially from one of its ends.

11. A cylindrical gear according to claim 9 wherein said concave and convex curves are substantially circular arcs.

* * * * *

UNITED STATES PATENT OFFICE

CERTIFICATE OF CORRECTION

Patent No. Re. 28,926 Dated August 10, 1976

Inventor(s) Meriwether L. Baxter, Jr.

It is certified that error appears in the above-identified patent and that said Letters Patent are hereby corrected as shown below:

In the Figure on the title page and in each of Figs. 1, 2, 3, 14 and 20 the word "line" should read --element--.

Fig. 20, the symbol "E" should be --E'--.

Signed and Sealed this First Day of March 1977

[SEAL]

*Attest:*

RUTH C. MASON
*Attesting Officer*

C. MARSHALL DANN
*Commissioner of Patents and Trademarks*